United States Patent [19]

Hoyt

[11] 4,148,279

[45] Apr. 10, 1979

[54] EAR BRACE FOR DOGS

[76] Inventor: Barrie Hoytt, Rte. 1, Box 46, Lockport, Ill. 60441

[21] Appl. No.: 793,623

[22] Filed: May 4, 1977

[51] Int. Cl.[2] .......... A01K 29/00

[52] U.S. Cl. .......... 119/96

[58] Field of Search .......... 119/96

[56] References Cited

U.S. PATENT DOCUMENTS

| | | | |
|---|---|---|---|
| 2,587,966 | 3/1952 | Cleary | 119/96 X |
| 3,257,990 | 6/1966 | Robertson et al. | 119/96 |
| 3,970,080 | 7/1976 | White | 119/96 X |

*Primary Examiner*—Louis G. Mancene
*Assistant Examiner*—Daniel J. Leach
*Attorney, Agent, or Firm*—Ernest Kettelson

[57] ABSTRACT

An ear brace for dogs, such as Doberman-Pinschers, whose ears require support during their early weeks and months to train the dog to hold its ears erect. The ear brace comprises a light wire frame having a crossarm slightly larger than the width of the dog's head, and two toed-in side arm members which converge inwardly as they extend downwardly from opposite sides of the crossarm. At the end of each side-arm member remote from the crossarm a substantially 90 degree bend is formed, toed inwardly and extending for about one-half inch and a reversely directed bend is then formed to provide a return portion in each side-arm member. The return portion of each side-arm member extends upwardly angled toward the respective ends of the crossarm from which the side-arm members depend, on a line which if extended would progressively approach the junction of each respective side-arm member and the respective ends of the crossarm from which they depend. The ear brace is used by spreading apart the side-arm members and sliding down on each side of the dog's head over the ears, then releasing the side-arm members to clamp each ear against the side of the dog's head.

7 Claims, 4 Drawing Figures

EAR BRACE FOR DOGS

BACKGROUND OF THE INVENTION

This invention relates to the field of devices used to train dogs of various breeds to hold their ears erect, and it has particular application to the training of Doberman-Pinschers. Typically the young Doberman's ears are trimmed at about two and one-half months, and the ears are then supported to train the dog to hold its ears in a proper erect position.

Previous methods in this field have included taping of the young dog's ears to the side of his head. However, tape has a tendency to become loosened, or to come off entirely. It is also an irritant to young dogs.

The present invention utilizes a light wire frame instead of tape, the light wire frame being shaped to provide a brace which fits comfortably over the young dog's head and presses the ears inwardly against the head. The wire frame is shaped to include a crossarm which extends across the dog's head, and depending sidearms which are toed-in and extend downwardly along each side of the head to press against the ears. The depending side arms include an offset return portion at the lower end to press against a wider region of the ear and to provide greater stability and retention characteristics for the ear brace.

SUMMARY OF THE INVENTION

It is an object of the invention to provide an ear brace for dogs which comprises a light wire frame formed by a continuous single length of wire bent and shaped into the desired configuration.

It is an object of the invention to provide an ear brace for dogs which minimizes irritation.

It is an object of the invention to provide an ear brace for dogs which is durable and cannot be readily damaged or torn off.

It is an object of the invention to provide an ear brace for dogs which is flexible, the tension of which is readily adjustable.

It is an object of the invention to provide an ear brace for dogs which becomes progressively more comfortable as the dog learns to hold his ears erect himself.

DESCRIPTION OF PREFERRED EMBODIMENT

Figure 1:
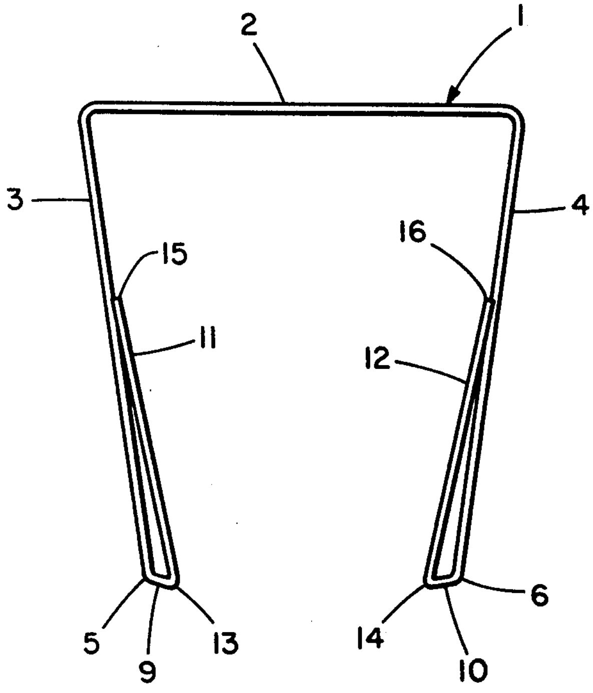
FIG. 1 is a front elevation view of an ear brace for dogs in accordance with this invention.
Figure 2:
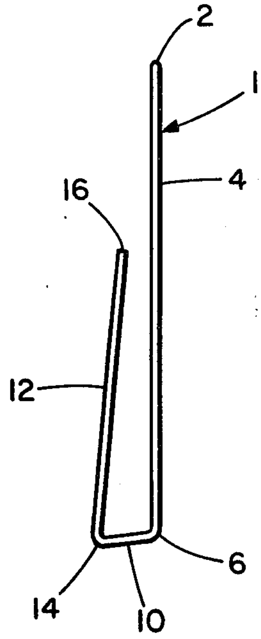
FIG. 2 is a side elevation view of the ear brace in FIG. 1.
Figure 3:
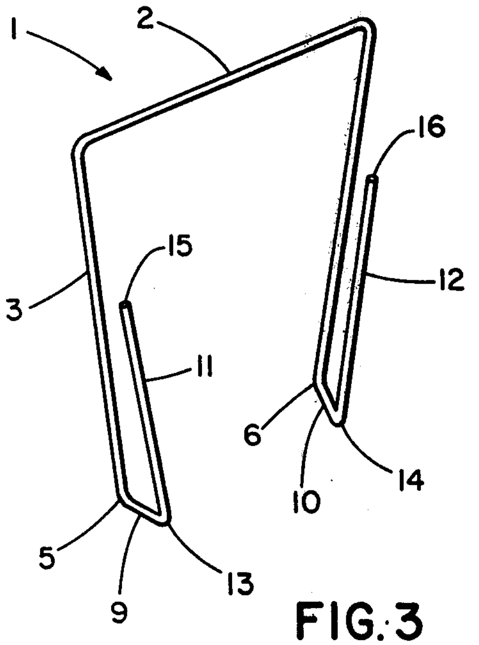
FIG. 3 is an isometric view of the ear brace in FIG. 1.
Figure 4:
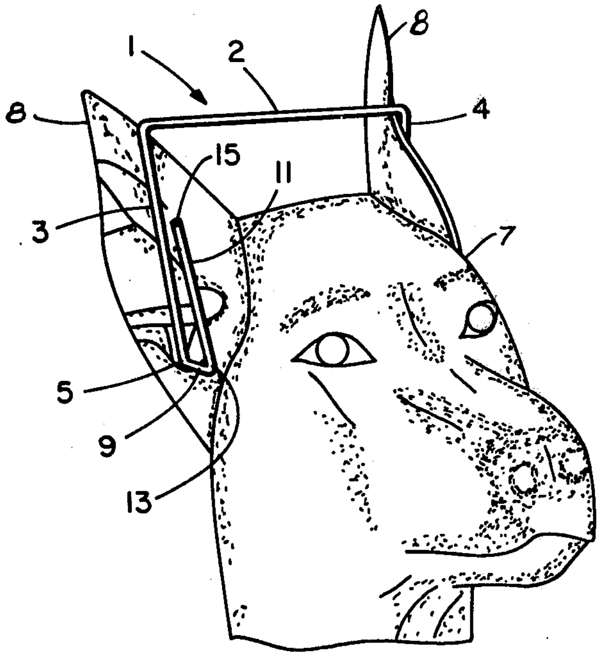
FIG. 4 is a perspective view showing the ear brace of FIG. 1 in place supporting the ears of a young dog in the erect position.

In accordance with this invention, an ear brace 1 for training young dog's such as Doberman-Pinschers to hold their ears erect is formed from a single length of light wire.

It includes a crossarm 2, and two main side-arms 3 and 4 depending from each opposite end of crossarm 2. The main sidearms 3 and 4 are toed-in and converge inwardly as they extend downwardly. The length of crossarm 2 corresponds to the width of the young dog's head on which it is to be used, and is somewhat wider to enable toeing-in the main side-arms 3 and 4.

The lower end 5 of the main side-arm 3 and lower end 6 of main side-arm 4 are spaced apart a lesser distance than the length of crossarm 2 before being placed in position on the young dog's head 7. The lower ends 5 and 6 are resiliently toed-in and may be spread apart under tension to fit the brace over the dog's head 7 and to provide inward pressure against the dog's ears 8. The inward pressure against the dog's ears which is provided by this ear brace becomes progressively less as the dog himself learns to hold his ears inwardly closer to his head and in the erect position. If the dog allows his ears to droop and flop outwardly, they bear against the restraining force of main side-arms 3 and 4 of the ear brace 2 which restraining force becomes progressively greater as the ears are allowed to fall outwardly from the dog's head. The pressure on the dog's ears and the discomfort for the dog thus becomes greater as he allows his ears to flop outwardly. Conversely, the pressure against the dog's ears becomes less as he learns to hold them close to his head in an erect position and the dog thus learns that this is the most comfortable position in which to hold his ears.

It is an important function of an ear brace to teach the dog to hold his ears erect by himself, which the brace in accordance with this invention accomplishes.

At the lower ends 5 and 6 of main side-arms 3 and 4, longitudinal spacers 9 and 10 are formed to extend in a direction generally longitudinal for a short distance, toed-inwardly slightly and preferably angled slightly from their respective main side-arms 3 and 4, at an angle which may be 90 degrees or slightly greater than 90 degrees, such as between 90 degrees and 95 degrees.

Return side-arms 11 and 12 are formed to extend upwardly from the end of respective longitudinal spacers 9 and 10, the return side-arms 11 and 12 being spaced apart from their respective corresponding main side-arms 3 and 4 to provide longitudinally spaced apart support means on each opposite side of the brace 1 to apply uniform pressure against a longitudinally defined area of each ear on each side of the dog's head. Such return side-arms 11 and 12 thus distribute the inwardly applied pressure of each side of the ear brace to a greater area of the ear than if the brace had only a single spoke depending arm.

The return side-arms 11 and 12 include respective integrally joined ends 13 and 14 and respective free ends 15 and 16. The ends 13 and 15 of return side-arm 11 lie on a straight line which is angled toward the end of crossarm 2 from which main side-arm 3 depends. The ends 14 and 16 of return side-arm 12 lie on a straight line which is angled toward the opposite end of crossarm 2 from which main side-arm 4 depends. The length of return side-arms 11 and 12 is less than that of main side-arms 3 and 4, return side-arm 11 and 12 returning towards respective opposite ends of the crossarm 2 only part way.

The longitudinal spacers 9 and 10 and return side-arms 11 and 12 provide increased longitudinal rigidity and stability to their respective main side-arms 3 and 4, whereby pressure can be distributed across a broader longitudinal area of each ear and can be applied with more stability and firmness along such longitudinal area, but without detracting from the greater sensitivity and reslience of the lateral pressure of the main side-arms 3 and 4 which are resiliently toed-in and converge toward each other at their lower ends. The sensitivity of such lateral pressure against each ear is important, since relatively slight movement of the ears inwardly by the dog himself results in relatively greater decrease in pressure against his ears with correspondingly greater decrease in discomfort. It is important that the lateral pressure against the dog's ears can be reduced to a relatively negligible factor when he learns to hold his ears inwardly toward his head and in the correct erect position. The dog thus learns that when he holds his ears erect he is rewarded by substantially eliminating the discomfort.

Thus, the partial return of the longitudinally spaced return side-arms 11 and 12 achieve the desired increase in longitudinal stability and distribution of pressure over a greater area of the ears, and at the same time still retain the desired lateral sensitivity and relatively greater flexibility of a single thin length of wire angled inwardly from opposite ends of the crossarm 2 as are the main side-arms 3 and 4.

I claim:

1. An ear brace for dogs, comprising a crossarm corresponding in dimension to the width of that part of a dog's head on which it is to be used and being slightly larger than such width, and side-arm means depending from said crossarm, wherein said side-arm means includes a first straight member depending from one end of said crossarm at an angle thereto to provide a first main side-arm, a second straight member depending from the opposite end of said crossarm at an angle thereto to provide a second main side-arm, said first and second side-arms being angled with respect to said crossarm to converge inwardly as they extend from said crossarm.

2. An ear brace for dogs as set forth in claim 1, including a first longitudinally extending spacer member extending from an end of said first main side-arm at an angle thereto, a second longitudinally extending spacer member extending from an end of said second main side-arm at an angle thereto.

3. An ear brace for dogs as set forth in claim 2, wherein said angle at which said spacer members extend from respective ends of said main side-arms is between 90 degrees and 95 degrees.

4. An ear brace for dogs as set forth in claim 2, including a first return side-arm extending angularly from an end of said first longitudinally extending spacer member, a second return sidearm extending angularly from an end of said second longitudinally extending spacer member.

5. An ear brace for dogs as set forth in claim 4, wherein said first and second return side-arms extend in a direction toward respective opposite ends of said crossarm, said first return side-arm being longitudinally spaced apart from said first main side-arm, said second return side-arm being longitudinally spaced apart from said second main side-arm.

6. An ear brace for dogs as set forth in claim 5, wherein the length of said return side-arms is less than the length of said main side-arms.

7. An ear brace for dogs as set forth in claim 6, in which said spacer members include respective first ends integrally joined with respective ones of said main side-arms, respective second ends integrally joined with respective ones of said return side-arms, said spacer members converging toward each other in a direction from their said first ends toward their said second ends.

* * * * *